United States Patent [19]

Cain et al.

[11] Patent Number: 4,895,440

[45] Date of Patent: Jan. 23, 1990

[54] LASER-BASED MEASUREMENT SYSTEM

[75] Inventors: Gary L. Cain, New Carlisle; Mark D. Sobottke, Kettering, both of Ohio; Joseph F. Rando, Los Altos Hills, Calif.

[73] Assignee: Spectra-Physics, Inc., San Jose, Calif.

[21] Appl. No.: 234,565

[22] Filed: Aug. 22, 1988

[51] Int. Cl.$^4$ .......................... G01C 3/08; G01B 11/26
[52] U.S. Cl. ......................................... 356/5; 172/4.5; 356/4; 356/152
[58] Field of Search ................ 172/4.5; 356/4, 5, 141, 356/152

[56] References Cited

U.S. PATENT DOCUMENTS

| | | |
|---|---|---|
| 3,298,024 | 1/1967 | Bohm . |
| 3,503,680 | 3/1970 | Schenkerman .......................... 356/5 |
| 3,562,161 | 3/1972 | Ross ........................................ 356/5 |
| 3,588,249 | 6/1972 | Studebaker . |
| 3,680,958 | 8/1972 | Von Bose .............................. 356/141 |
| 3,790,277 | 2/1974 | Hogan ................................... 356/152 |
| 3,813,171 | 5/1974 | Teach et al. . |
| 3,873,226 | 3/1975 | Teach . |
| 3,997,071 | 12/1976 | Teach . |
| 4,030,832 | 6/1977 | Rando et al. . |
| 4,034,490 | 7/1977 | Teach . |
| 4,413,907 | 11/1983 | Lane ..................................... 356/141 |
| 4,830,489 | 5/1989 | Cain et al. ................................ 356/4 |

Primary Examiner—Stephen C. Buczinski
Attorney, Agent, or Firm—Killworth, Gottman, Hagan & Schaeff

[57] ABSTRACT

A laser beam three dimensional position measurement system includes a laser transmitter mounted at a stationary reference position at a work site and a receiver mounted on a mobile machine at the site. The transmitter produces a laser reference plane by sweeping a laser beam about the transmitter. The receiver includes a retroreflector which intercepts and reflects laser energy back to the transmitter when the laser beam sweeps past the retroreflector. The system also includes at the transmitter a circuit composed of a photodetector, timer, clock and counter. The photodetector senses laser energy reflected back to the transmitter from the retroreflector. The timer modulates the laser beam produced by the transmitter in response to detection of the beam. The counter is connected to the clock and timer, and is enabled by the timer to start counting electrical pulses received from the clock when the beam is modulated. The counter is disabled to stop counting electrical pulses when the modulation is detected. The number of pulses counted by the counter is indicative of the range of the receiver from the transmitter. The orientation of the beam relative to a fixed reference axis at the time reflected laser energy is detected defines the direction of the receiver relative to the transmitter.

19 Claims, 8 Drawing Sheets

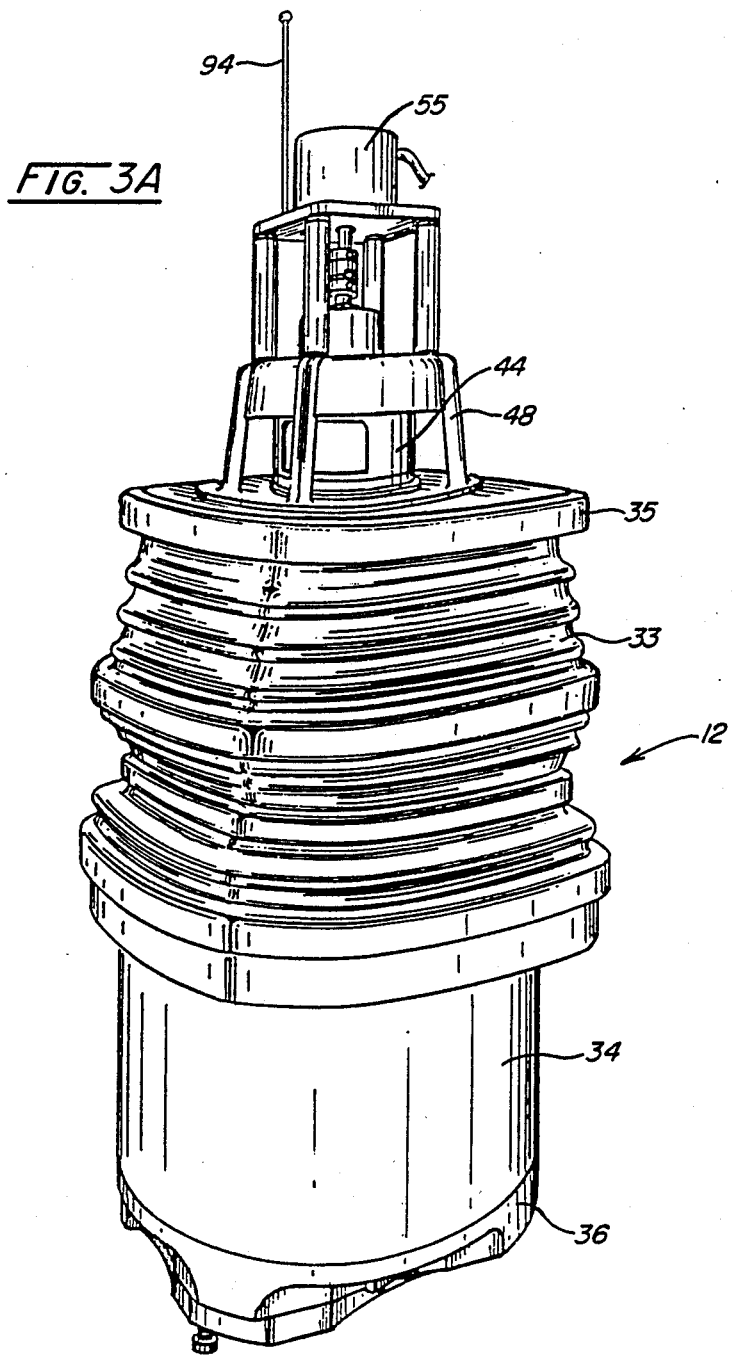

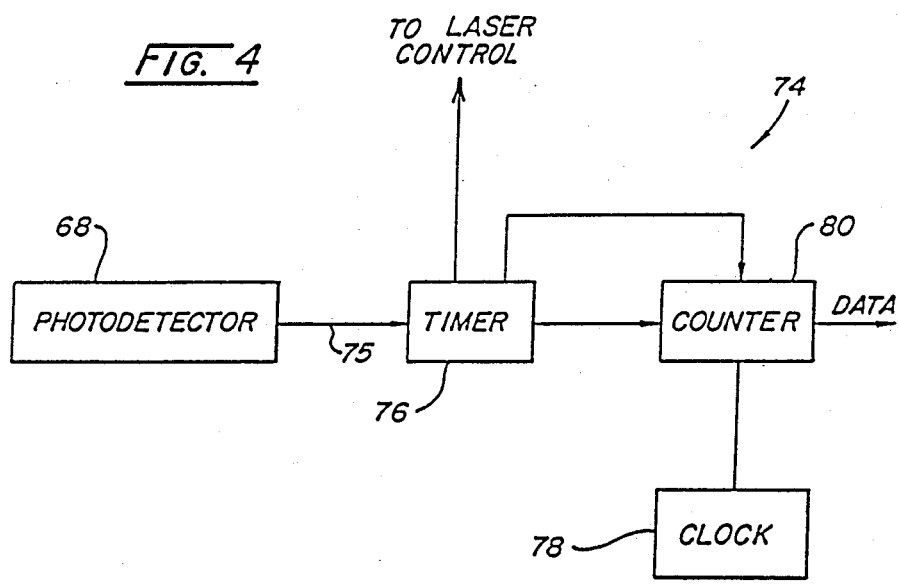
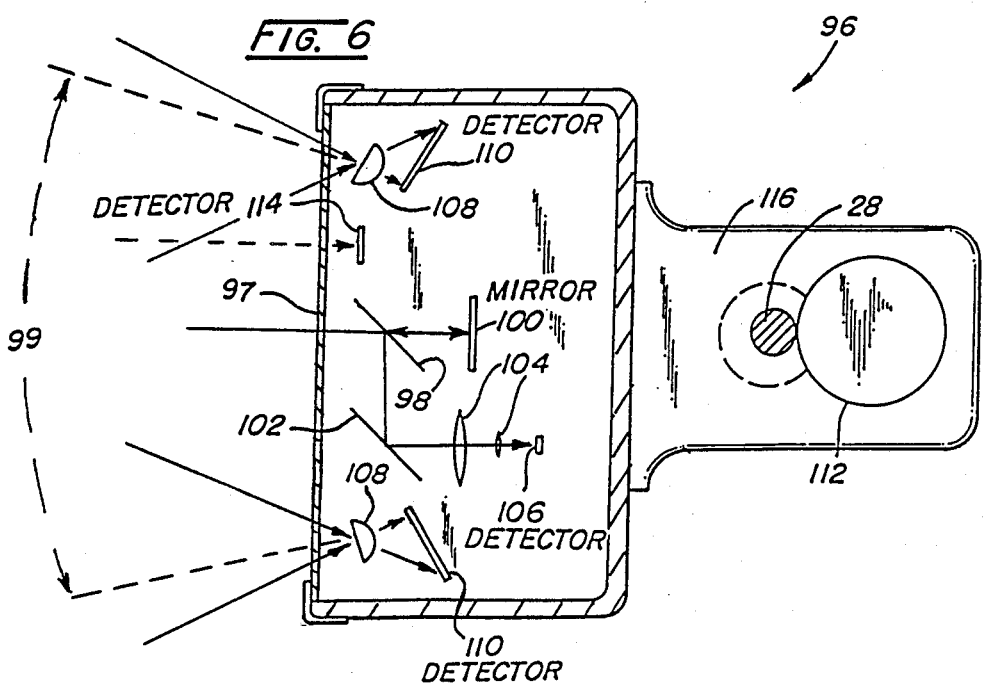

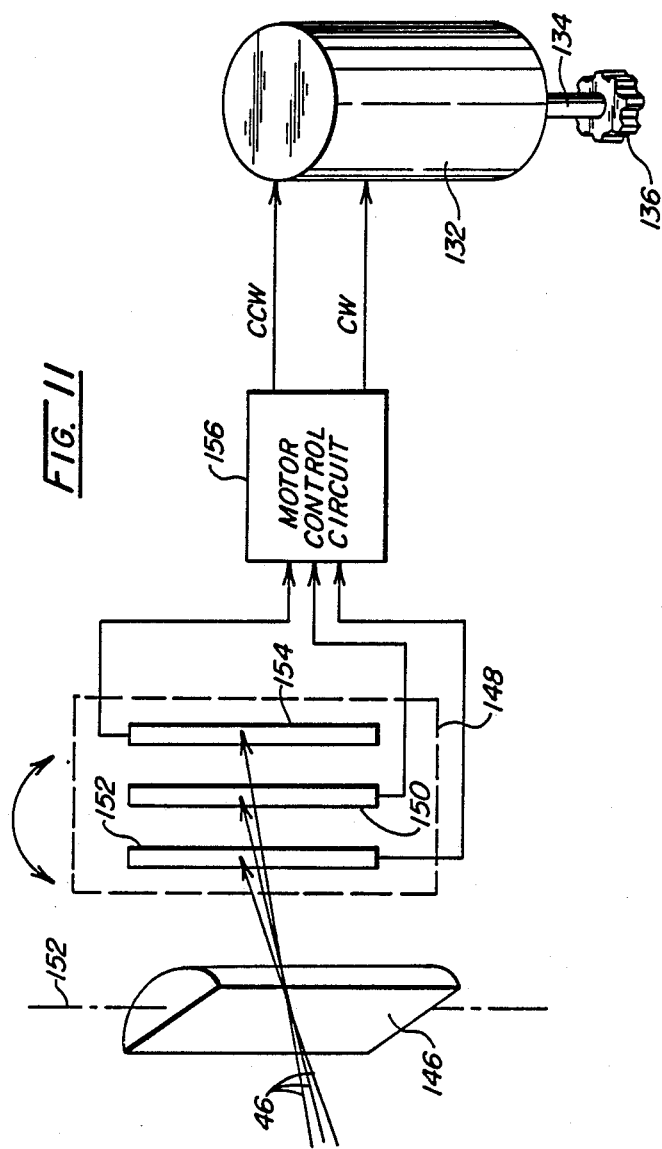

LASER-BASED MEASUREMENT SYSTEM

CROSS REFERENCE TO RELATED APPLICATION

Reference is hereby made to the following copending application, dealing with related subject matter and assigned to the assignee of the present invention: by Gary L. Cain, DuWain K. Ake, and Ted L. Teach, assigned U.S. Ser. No. 898,080 and filed Aug. 20, 1986, now U.S. Pat. No. 4,830,489.

BACKGROUND OF THE INVENTION

The present invention generally relates to laser-based systems useful in construction applications and, more particularly, to a laser-based system for measuring the position of a receiver, mounted on mobile construction equipment operating at a work site, with respect to a transmitter located at a stationary reference position at the work site. The position of the receiver is determined in three dimensions by the system.

In prior laser-based systems, such as that disclosed in U.S. Pat. No. 3,588,249, for example, a reference plane is established throughout a work site by a transmitter which emits laser energy in a level reference plane. The reference plane is typically established by a laser beam which is projected radially outward from the transmitter and rotated continuously through 360 degrees to sweep around the entire work site. One or more receivers may be employed throughout the work site to sense the location of this reference plane. Such receivers may be mounted on a surveyor rod as described in U.S. Pat. No. 4,030,832, or they may be employed as part of a control system for construction or agricultural equipment as described in U.S. Pat. Nos. 3,813,171; 3,873,226; 3,997,071; and 4,034,490.

Prior laser systems have provided an indication of elevation throughout the work site, but they have not typically indicated the position of the receiver within the work site. Thus, for example, the height of the blade on a road grader with respect to the reference plane can be measured by such prior systems, but if this height is to vary over the work site it is necessary for the operator to determine by some other means where the road grader is located within the site in order to know precisely what the elevation should be at that location. In other words, prior laser systems provide only one dimension of position information, that being elevation.

The laser survey system disclosed in the above cross-referenced patent application provides not only elevation information, but also position information in two other axes. The system includes a laser transmitter, located at a reference position at the work site, which sweeps a laser beam radially in a reference plane. The system includes a receiver, located on mobile earthmoving equipment operating at the work site, which has a sensor that determines the relative elevation of the laser reference plane. The receiver also includes a pair of reflectors, each of which reflects laser energy back to the transmitter. The reflectors are oriented by an appropriate control system such that a reference line extending between them is generally perpendicular to the beam as the beam sweeps across the reflectors. The laser transmitter has a sensor which receives the reflected laser energy, and, in response thereto, produces receiver position information for transmission to the receiver.

The laser transmitter is designed to rotate the laser beam continuously through 360 degrees at a substantially constant annular velocity and thus sweep the beam past the two reflectors of the receiver once during each revolution. During each revolution of the laser beam, the transmitter receives back two short bursts or pulses of laser energy from the two reflectors. Thus, since the laser beam sweeps at a substantially constant angular velocity and the distance between the reflectors is fixed, the time period between receipt of these two pulses provides a highly accurate basis for the calculation of the range, or distance of the receiver from the transmitter. The orientation of the beam at the time that the two pulses are received defines the direction of the receiver with respect to the transmitter. This may be detected by an angle encoder or similar arrangement on the transmitter.

It is realized that the accuracy of the range calculation is dependent upon a uniform rotational velocity for the laser beam. Should conditions unexpectedly arise under which operation of the transmitter introduces an unacceptable degree of variability in the laser beam angular sweep velocity, the accuracy of the range calculation will decrease accordingly.

Consequently, a need exists for an alternative approach to determining the range or distance of the receiver from the transmitter. An approach is desired in which the accuracy of the range calculation does not depend upon maintaining a substantially constant angular velocity of the laser beam, and thus reducing the need for highly precise mechanical operation of the transmitter.

SUMMARY OF THE INVENTION

In the present invention the time required for the beam to travel from the transmitter to the receiver and then reflect back to the transmitter in measured. Such time is representative of the range of the receiver from the transmitter and is not dependent upon the angular laser beam sweep velocity.

In accordance with one aspect of the present invention, a laser beam three dimensional measurement system comprises a transmitter at one position which produces a laser reference plane by sweeping a laser beam about the transmitter, and a receiver at another position which intercepts the laser reference plane. Reflector means at the receiver reflects the laser beam back to the transmitter when the laser beam sweeps past the receiver. At the transmitter there is located first means for sensing laser beam energy reflected back to the transmitter from the receiver, second means for modulating the laser beam in response to the receipt of laser beam energy reflected back to the transmitter by the reflector means, and third means for producing an electrical signal related to the time period between the transmission of the modulated beam and the sensing of the modulation by the first means. This time period is directly proportional to the range of the receiver from the transmitter.

The orientation of the beam relative to a fixed reference axis at the time reflected laser energy is detected defines the direction of the receiver relative to the transmitter. The laser beam three dimensional measurement system may further comprise signal transmitting means at the transmitter for sending the range information to the receiver where it is received such that the equipment upon which the receiver is mounted can identify its position within a work site.

The modulation of the laser beam may comprise momentarily terminating its transmission. The electrical signal produced by the third means at the transmitter may be represented by a count which is generated during the time of the transmission of the modulated laser beam and the time of its detected reflection. The reflector means may comprise a passive reflector device made up for example of at least one retroreflective cylinder. The passive reflector device may alternatively comprise at least one corner cube and tracking means for directing the corner cube towards the transmitter. In such a tracking passive reflector device, the tracking means may comprise a first photodetector having second and third photodetectors positioned on opposite sides thereof with the photodetectors generating electrical signals when the laser beam impinges thereon. Lens means direct the laser beam onto a field including the first, second and third photodetectors while motive means provide for rotating the passive reflector device. Circuit means responsive to the electrical signals generated by the photodetectors are provided for controlling the motive means to maintain the passive reflector device in a position such that the laser beam impinges upon the first photodetector. The lens means may comprise a cylindrical lens.

Accordingly, it is an object of the present invention to provide a three dimensional position measurement system which produce a range measurement of enhanced accuracy; to provide a range measurement which is based on the time of travel of the laser beam from the transmitter to the receiver and back to the transmitter; to provide a position measurement system which measures the angle from a transmitter to a receiver with respect to a fixed reference axis; and, to provide a receiver for the measurement system which utilizes a passive reflective device.

BRIEF DESCRIPTION OF THE DRAWINGS

FIG. 3A is a perspective view of the laser transmitter employed in the measurement system of FIG. 2;

FIG. 4 is a block diagram of the circuit employed in the laser transmitter of FIG. 3A;

FIG. 6 is a schematic view of the optical components of an alternative receiver which can be used in the position measurement system of the present invention;

FIG. 11 is a schematic diagram illustrating the tracking operation of the tracking retroreflector of FIGS. 7-10.

DETAILED DESCRIPTION OF THE PREFERRED EMBODIMENT

Figure 1:
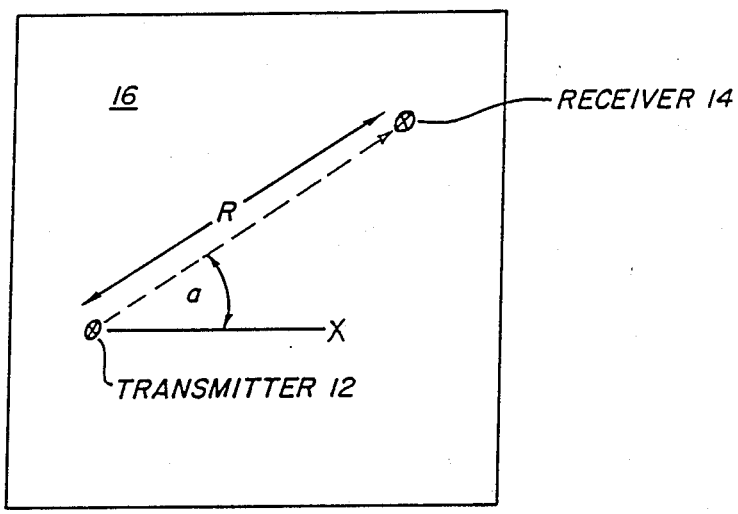
FIG. 1 is a diagrammatic representation of a work site with a transmitter and a receiver of the laser-based position measurement system of the present invention being located therein.
Figure 2:
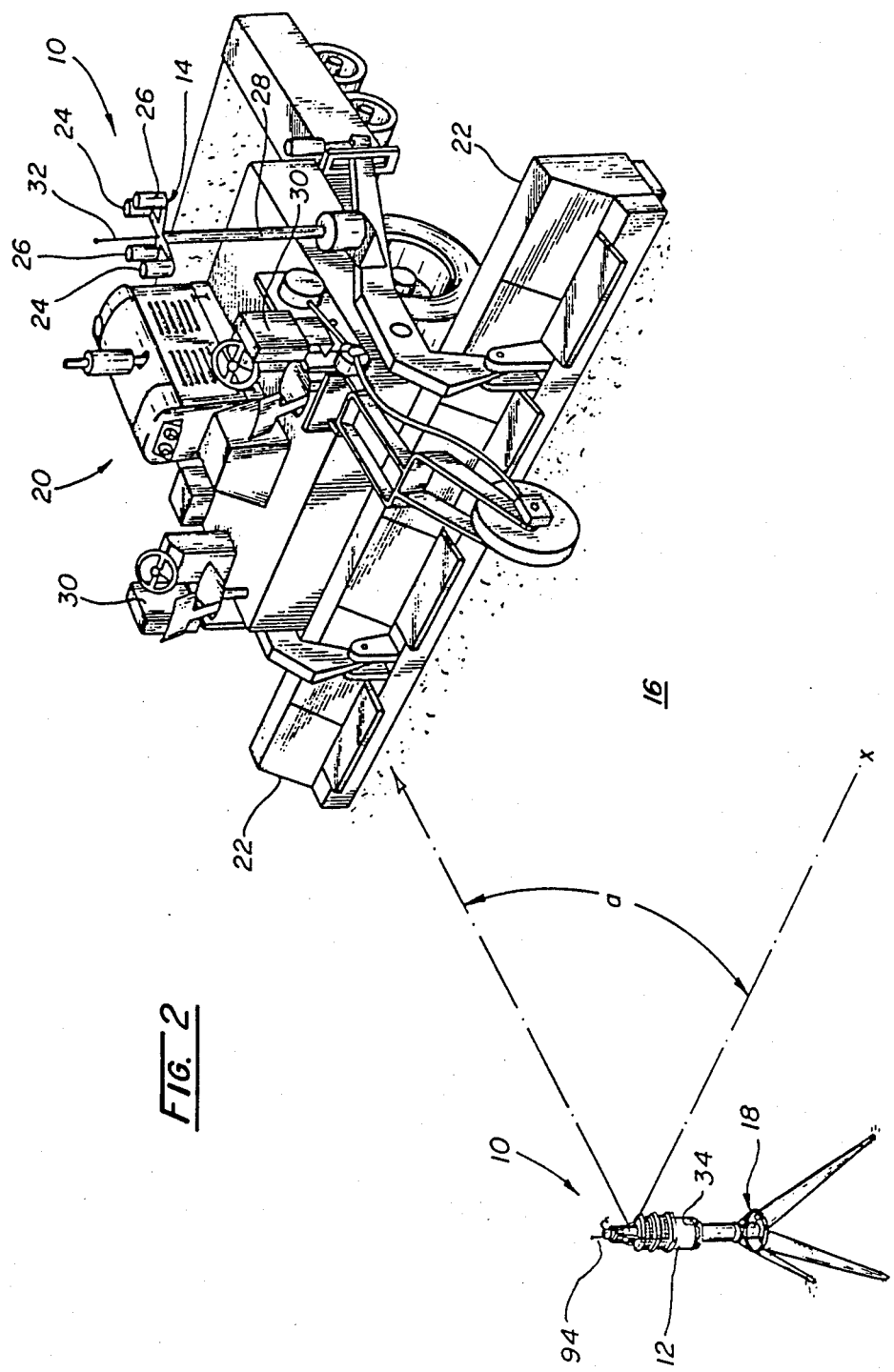
FIG. 2 is a pictorial view of a work site showing a stationary laser transmitter and a receiver mounted on a mobile paving machine, which transmitter and receiver comprise components of the laser-based position measurement system of the present invention.

FIGS. 1 and 2 of the drawings illustrate the arrangement of components of a laser-based three dimension position measurement system, generally designated 10, which operates in accordance with the principles of the present invention. The position measurement system 10 basically includes a laser transmitter 12 and receiver 14. FIG. 1 is a diagrammatic representation of a work site 16 with the transmitter 12 and receiver 14 located therein at a distance R from one another, and with the receiver 14 being positioned at an angle a with respect to a reference X axis arbitrarily defined at the transmitter 12.

FIG. 2 shows the work site 16 with the laser transmitter 12 mounted on a tripod 18 and the receiver 14 mounted on a mobile piece of construction equipment comprising a paving machine 20. The laser transmitter 12 is situated at a fixed reference point in the work site 16. The work site 16 might be a large parking lot, an air field, a construction site or other area which, for example is to be paved. The paving machine 20 moves about the work site 16 depositing paving material at a thickness which will bring the top surface up to a desired grade. It can be appreciated that while such pavement is substantially level, it usually will be slightly contoured in order to properly channel run-off from rain storms. Such contouring is specified on a topographic plan as elevations at specified positions throughout the site. As will become apparent below, while the present invention is illustrated in use with a paving machine, it will have utility with a wide variety of construction equipment.

The paving machine 20 is equipped With a control system for automatically maintaining each end of a distributor 22 at a desired elevation with respect to a laser reference plane produced by the laser transmitter 12. Such a control system is described in U.S. Pat. No. 3,873,226 entitled "Laser Beam Control System For Road Paving Machines" and it is responsive to signals produced by the receiver 14 and transmitter 12. The receiver 14 includes a height detector means in the form of a pair of vertically-oriented height detectors 24 and range detector means in the form of a pair of vertically-oriented retroreflectors 26. By using a pair of height detectors 24 and a pair of retroreflectors 26, at least one of each pair will intercept the laser reference plane regardless of the direction faced by the paving machine 20.

The detectors 24 and retroreflectors 26 of the receiver 14 are supported by a mast 28 on the paving machine 20. The height detectors 24 are of conventional design. The retroreflectors 26 may take the form of cYlinders covered with retroreflective tape. The arrangement and cooperation of the retroreflectors 26 with the transmitter 12 in accordance with the principles of the present invention will be described below in detail.

As described in the above-cited U.S. Pat. No. 3,873,226, the control system also raises and lowers the distributor 22 to maintain the top surface of the pavement at a desired elevation despite the unevenness of the ground on which the paving machine 20 operates. The control system operates in response to signals representing elevation information generated by the detectors 24 and in response to signals representing range R and angle a information generated by the cooperative operation of the retroreflectors 26 and the transmitter 12. This information may be displayed on an operator panel 30 located adjacent to the operator and may, if desired, be supplied to an automatic control system which raises and lowers the distributor 22 in order to maintain the top surface of the site at the desired grade. The way in which the range and angle data are generated is described below.

Still referring particularly to FIGS. 1 and 2, the laser transmitter 12 produces a beam of laser energy which is projected outward therefrom. This beam is continuously rotated through 360 degrees at a substantially constant angular velocity such that it sweeps past the receiver 14 once during each revolution. A reference axis, X, is arbitrarily established and the angular position of the receiver 14 with respect to this X axis is determined by the angular orientation of the beam when it is reflected back from the receiver 14 to the transmitter 12. Similarly, the range R of the receiver 14 is determined from the time required to return laser energy back to the transmitter 12 via either one of the retroreflectors 26 of the receiver 14. This position information, i.e., the range R and angle a, is then conveyed by a radio transmission from the transmitter 12 to a radio receiver, including an antenna 32 mounted on the mast 28 on the machine 20. This information is combined with the elevation information which is generated directly by the height detectors 24 in the conventional manner. The three dimensional position of the paving machine 20 is thus established, and can be displayed or employed to control the elevation of the distributor 22 automatically.

Figure 3B:
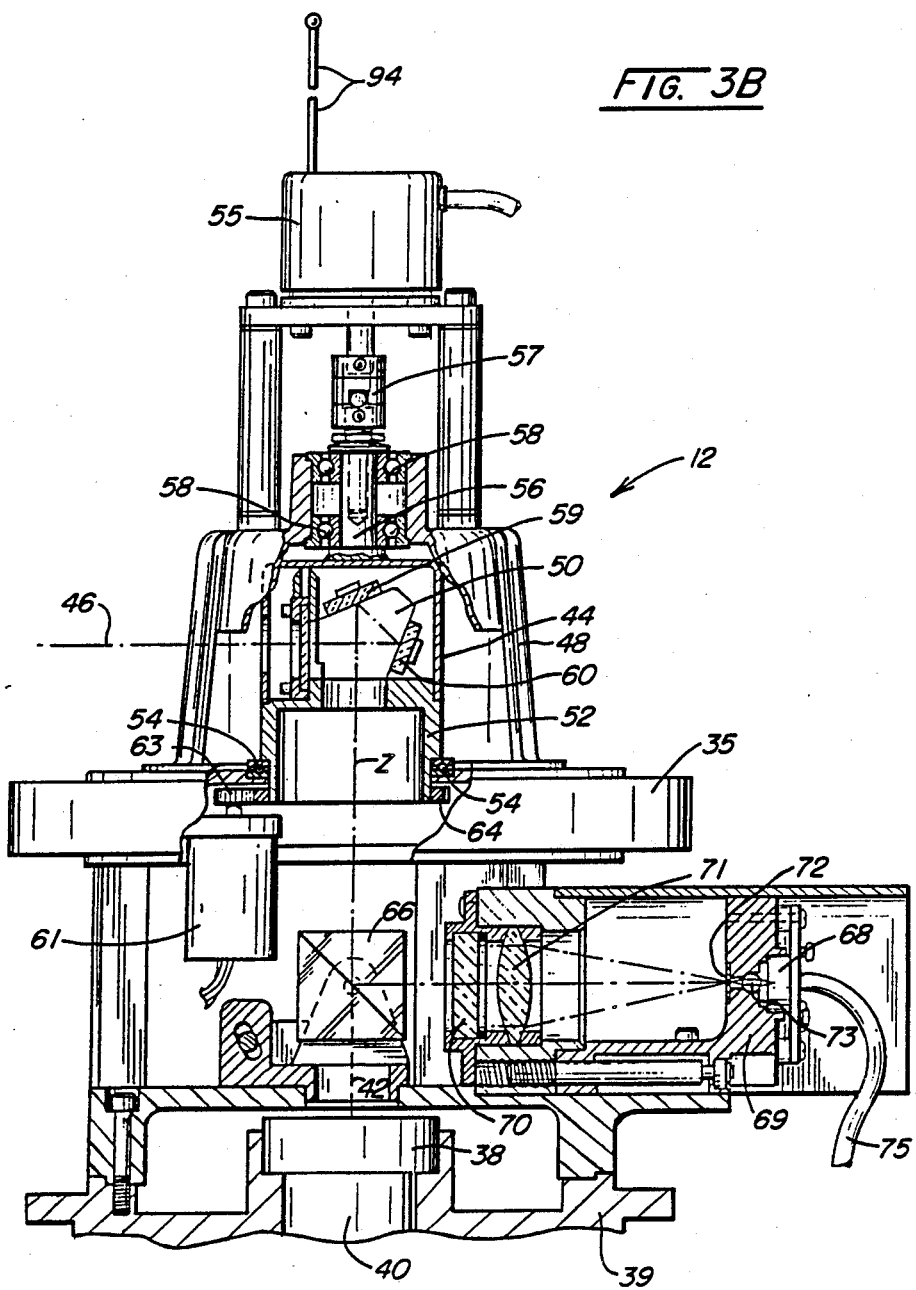
FIG. 3B is a partial view, with parts broken away and in section, of the laser transmitter of FIG. 3A.

Referring now particularly to FIGS. 3A and 3B, there is shown the laser transmitter 12 employed by the position measurement system 10 of the present invention. The laser transmitter 12 includes a cylindrical housing 34 which provides a sealed, water-tight enclosure for internal components. A rubber boot 33 (omitted from FIG. 3B) extends around the upper portion of a housing 34 below a plate 35 at the upper end of the housing 34 to provide additional protection for the transmitter components. A base plate 36 is attached to the bottom of the housing 34, and it is adapted for attachment onto the tripod 18. A laser beam projector 38 is mounted within the housing 34 to a gimbal frame 39 which enables it to be positioned along a generally vertical Z axis. The laser beam projector 38 includes a tubular body 40 which extends downward into the housing 34 and a laser diode (not shown) which is mounted at its lower end. The laser diode produces a low-power output beam in the infrared or visible band of the light spectrum. Optics are provided at the top of the tubular body 40 for projecting the laser beam upward along the Z axis. This output is indicated at 42 in FIG. 3B.

The collimated laser beam 42 passes upwardly through the optics of the tubular body 40 into a pentaprism reflecting head 44. The head 44 projects the laser beam at 46 radially outward along a generally horizontal path through a lighthouse structure 48 mounted on top of the plate 35 which is also attached to the gimble frame 39. The reflecting head 44 comprises a pentareflector assembly 50 mounted on a platform 52 which is supported for rotation about the Z axis by bearings 54, a shaft 56 and bearings 58. A shaft angle encoder 55 is mounted on the top of the lighthouse structure 48 and is also connected to the shaft 56 by means of a coupling 57. The pentaprism reflecting head 44 is rotated at a substantially constant angular velocity by an electric motor 61 which is coupled to the platform 52 by means of pulleys 63 and 64 and a drive belt (not shown) extending therearound.

The pentareflector assembly 50 includes a pair of mirrors 59 and 60 which are precisely mounted to reflect the laser beam a total of ninety degrees. As the pentaprism reflecting head 44 rotates, the laser beam 46 is swept through 360 degrees to define a horizontal reference plane that extends radially outward in all directions from the laser transmitter 12. The shaft angle encoder 55 provides a digital indication of the angular orientation of the beam with respect to the reference axis X.

The laser transmitter 12 described thus far is one which is similar to a transmitter described in greater detail in U.S. Pat. No. 4,062,634, incorporated herein by reference. Referring still to FIGS. 3A and 3B, the transmitter 12 required to implement the preferred embodiment of the present invention is a modified version of this conventional device. One modification to the laser transmitter 12 is the inclusion of a beam splitter 66 which is mounted near the upper end of the tubular body 40. The beam splitter 66 is preferably a prism which allows the laser beam 42 to pass upward through it with minimal loss.

However, laser energy reflected from the receiver 14 passes down to the beam splitter 66 where it is reflected to a photodetector 68, mounted on support 69. Light from the beam splitter 66 passes through a 780 nm. bandpass light filter 70 having a 20 nm. bandpass, to reduce the effects of ambient light. The light then passes through a focusing lens 71 to a pin hole 72 which has a diameter of approximately 0.004 inches and which limits the angular acceptance of the photodetector 68. Finally, a relay lens 73 directs the light to the detector 68. When reflected laser energy enters the transmitter 12, therefore, a detection signal is provided via lead wires 75.

It should now be apparent that the photodetector 68 within the transmitter 12 produces a detection signal on wires 75 indicating whether or not laser energy is reflected back to the transmitter 12. This feature is utilized to determine the distance or range R of the receiver 14 from the transmitter 12 in accordance with the principles of the present invention.

Figure 5:
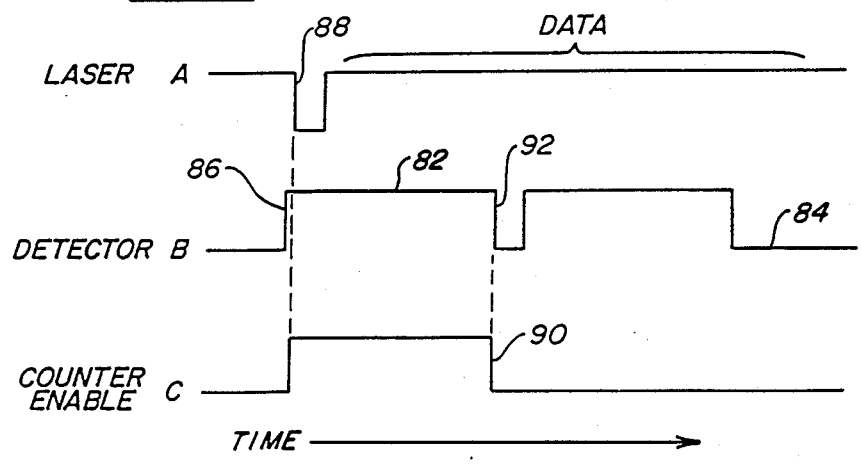
FIG. 5 is an electrical timing diagram which illustrates the operation of the circuit of FIG. 4.

FIGS. 4 and 5, illustrate the circuit 74 employed in the laser transmitter 12 of FIG. 3A and an electrical timing diagram depicting the operation of the circuit 74, respectively. The circuit 74 includes the photodetector 68, a timer 76, a clock 78 and a counter 80. The circuit 74 is represented in block diagram form since its components, per se, are well known in the art, and since reproducing them in detail would only serve to increase the complexity of the explanation of the present invention without adding to its clarity.

In particular, as mentioned before, the photodetector 68 is capable of sensing laser energy reflected back to the transmitter 12 from one of the retroreflectors 26 producing a corresponding electrical signal. Specifically, as seen in FIG. 5, the photodetector 68 produces an electrical signal B at a high level indicated at 82 when reflected laser energy is sensed and at a low level indicated at 84 when reflected laser energy is not sensed. The timer 76, coupled to the photodetector 68 via the output wires 75 therefrom, is operable to momentarily shut off the laser beam 46 of the transmitter 12 for a period of approximately 0.1 microsecond in response to receipt of the high level electrical signal 82 from the photodetector 68. The transition at 86 in FIG. 5 from low to high level represents the detection of the reflected laser energy by the photodetector 68 and the actuation of the timer 76 to cause the momentary shut off of the laser beam 46 of the transmitter 12 as indicated at 88, shortly thereafter. Circuit 74 measures the time it takes the laser beam 46 to travel from the transmitter 12 to the retroreflector 26 of the receiver 14 and then back to the transmitter 12. This is accomplished by measuring the time that it takes for the detector 68 to cease detection of the reflected beam after the beam as indicated at 92 of FIG. 5 is momentarily shut off.

The clock 78 of the circuit 74 is operable to produce electrical pulses at a predetermined high rate, preferably at 500 MHz. The counter 80 of the circuit 74 is connected to the timer 76 and clock 78. As depicted in FIG. 5, the counter 80 is enabled by the timer 76 to start counting the electrical pulses received from the clock 78 when the timer 76 momentarily shuts off the laser beam 46 of the transmitter 12. This shutoff is represented by the transition at 88 in diagram A of FIG. 5. As represented by the transition 90 in diagram C of FIG. 5, the counter 80 is disabled by the photodetector 68 to stop counting the electrical pulses when the beam ceases to be detected, as a result of the preceding momentary shutoff of the laser beam of the transmitter 12.

The number of pulses counted by the counter 80 is indicative of the range R of the receiver 14 from the transmitter 12. The azimuth measurement, as represented by the angle a of the position of the receiver 14 from a reference axis X, can be determined in a number of different ways. One way is to employ a rotary angle position encoder, such as the shaft angle encoder 55, coupled to rotate with the laser beam so that the angle a may be read from this encoder when a reflected light pulse is received by the transmitter 12 from the receiver 14. Another way in which this may be accomplished is by timer circuitry for determining the ratio of the time required for the beam to make a complete rotation to the time required for the beam to rotate from the reference axis to the point at which a reflection of the beam from the receiver is sensed.

Regardless of the method adopted for measuring the angle a, information regarding the range R and angle a can be sent to the location of the receiver 14 in one of at least two ways. As depicted in FIG. 2, a radio transmitter (not shown) having an r.f. signal transmitting antenna 94 mounted at the laser transmitter 12 may be employed to transmit this information to a radio receiver connected to the r.f. signal receiving antenna 32 on the mast 28 at the receiver 14.

As an alternative to the radio transmission depicted in FIG. 2 the laser beam may be modulated to send this information over the laser beam itself to a secondary active receiver 96, shown in FIG. 6, located at the receiver 14. If the second approach is used, the information measured during the previous sweep of the beam is preferably superimposed on the laser beam during the time period marked as DATA in FIG. 5.

Referring to FIG. 6, the secondary active receiver 96 includes transparent window 97 which passes incident light to a beam splitter 98. The beam splitter 98 directs part of the incident laser beam to a retroreflector 100 and part of the beam via an arrangement of a mirror 102 and lens system 104 to a photodetector 106 which senses the transmitted data. Light striking the retroreflector 100 is reflected back to the transmitter 12 in the manner described above. Since this receiver 96 is directional in operation, a cylindrical lens 108 and tracking photocell 110 are positioned at either end of the receiver 96 to receive the laser beam and actuate a tracking motor 112 to rotate bracket 116 on the mast 28 and keep the receiver 96 pointed toward the transmitter 12. The manner in which the tracking motor 112 is actuated is the same as that described in the above cross-referenced application, now U.S. Pat. No. 4,830,489 the disclosure of which is incorporated herein by reference. The lenses 108 and tracking photocells 110 are positioned such that both of the photocells 110 are illuminated by the laser beam projected by the transmitter 12 when the laser beam is incident on the window 97 within an angular range 99 of approximately 45° to 50°. If the laser beam incident angle goes outside this range, one of the tracking photocells 110 will no longer be illuminated and the receiver 96 will be moved toward that photocell until it is once again illuminated to orient the receiver 96 such that the laser beam is once again incident within the angular range 99. The receiver 96 can also include a Z photocell array 114 which extends vertically, i.e. out of the plane of FIG. 6 and can be used instead of the height detectors 24 to determine the vertical component of the receiver position.

An alternate tracking retroreflector 120, which can be used in place of the pair of retroreflectors 26 previously described and may be preferred in certain applications is shown in FIGS. 7–10 and its operation is illustrated in the schematic diagram of FIG. 11. The tracking retroreflector 120 comprises a housing 122 which is mounted for rotation relative to a mast 124. The housing 122 is secured to a rotatable member 126 which extends into a sleeve 128 which is secured to the mast 124. The rotatable member 126 is supported for rotation by bearings 130.

Rotation of the housing 122 is performed by a motor 132 having an output drive shaft 134 to which a drive gear 136 is secured. The drive gear 136 meshes with a fixed gear 138 which is secured to the sleeve 128 and hence the mast 124. It is thus apparent that by operating the motor 132 the drive gear 136 will rotate around the fixed gear 138 to in turn rotate the housing 122 and rotatable sleeve 126 relative to the mast 124 with free rotation being assured by the bearings 130. Power leads are passed to electrical equipment in the housing 122 by means of a brush assembly 140.

Figure 7:
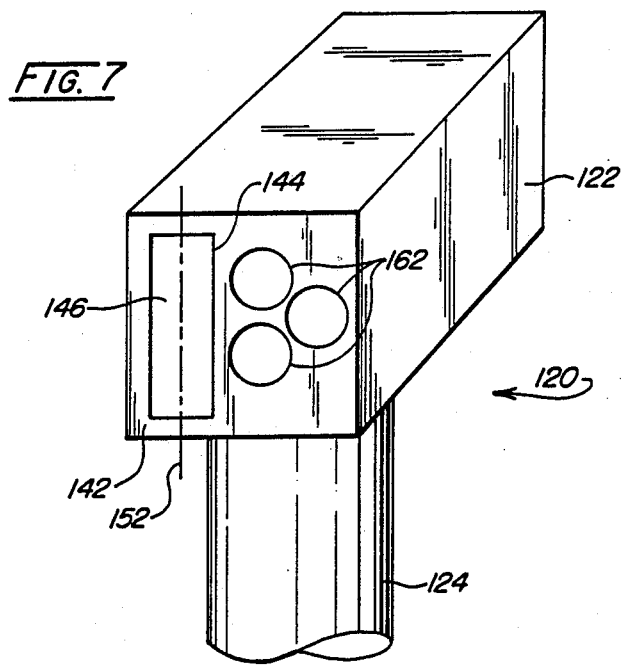
FIGS. 7-10 show a tracking retroreflector which can be used in the present invention.
Figure 9:
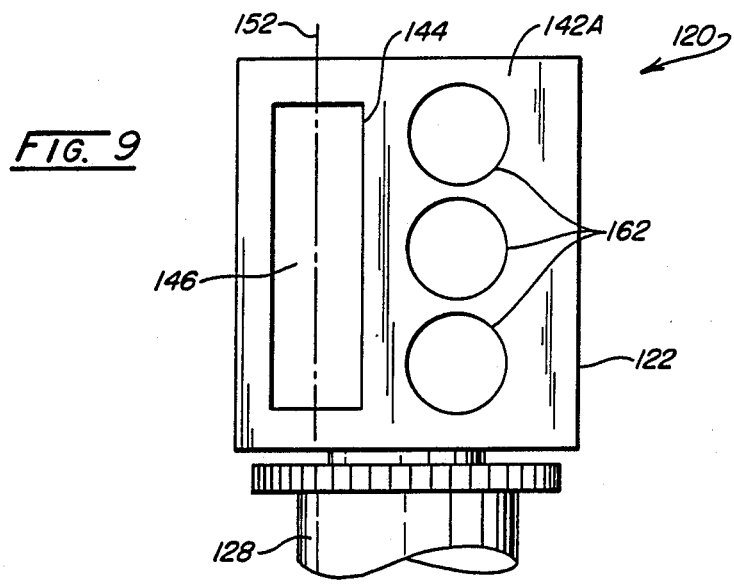
Figure 10:
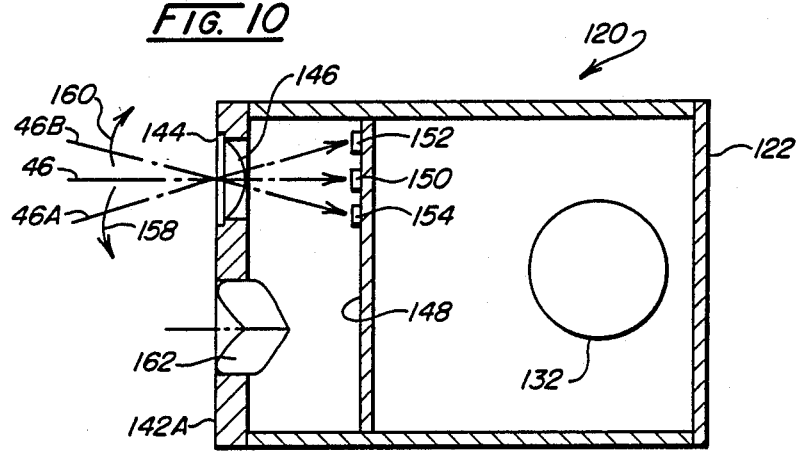

Two alternate faces 142, 142A of the tracking retroreflector 120 are shown in FIGS. 7 and 9. The face 142, 142A include an elongated opening 144 into which is fitted a cylindrical lens 146. The lens 146 directs the laser beam from the transmitter 12 to a portion of a plane 148 positioned behind the lens 146, see also FIG. 11. As shown in FIGS. 10 and 11, if the face 142, 142A of the housing 122 is pointed substantially directly at the transmitter 12, the laser beam will pass through the cylindrical lens 146 such that it impinges upon a first photodetector 150 positioned in a generally central location parallel to the axis 152 of the cylindrical lens 146. A second photodetector 152 is positioned to the left of the first photodetector 150 as viewed from the transmitter 12 and a third photodetector 154 is positioned to the right of the first photodetector 150 as viewed from the transmitter 12.

Each of the photodetectors 150, 152, and 154 generate electrical signals which are passed to a motor control circuit 156 to control the motor 132. If the face 142, 142A of the housing 122 is pointed substantially directly at the transmitter 112 such that the laser beam 46 impinges upon the first photodetector 150, the housing 122 is maintained in that position. If the laser beam 46 instead impinges upon the second or third photodetector 152 or 154, the motor 132 is activated to reposition the housing 122.

As shown in FIG. 10, if the housing 122 is positioned such that the laser beam 46A impinges upon the second photodetector 152 positioned to the left of the first photodetector 150, the motor control circuit 156 will generate a signal to rotate the housing 122 in a counter-clockwise direction as indicated by the arrow 158 associated with the laser beam 46A. The motor 132 is operated to move the housing 122 in a counter-clockwise direction until the laser beam 46 once again impinges upon the first photodetector 150. On the other hand, if the housing 122 is positioned such that the laser beam 46B impinges upon the third photodetector 154 such that it generates an electrical signal, the motor control circuit 156 will generate signals which are passed to the motor 132 to rotate the housing 122 in a clockwise direction as indicated by the arrow 160 associated With the laser beam 46B. In this way, the housing 122 is tracked such that its face 142, 142A is continuously pointed substantially in the direction to the transmitter 12.

Figure 8:
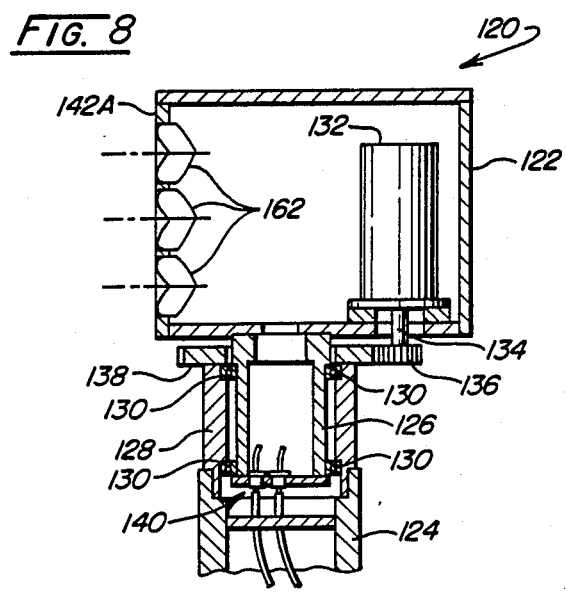

With the housing 122 being thus positioned, a series of three corner cube reflectors 162 are continuously pointed with sufficient accuracy such that one or more of the corner cube reflectors 162 will retroreflect the laser beam from the transmitter 12. As shown in FIGS. 8, 9 and 10, the corner cube reflectors 162 are oriented in vertical alignment relative to one another; however, for this configuration there may be a small dead space between the corner cube reflectors 162 if beam size is small relative to reflector diameter. To ensure that at least one of the corner cube reflectors 162 is engaged by a laser beam which is swept across the central portion of the face 142, 142A of the housing 122 of the tracking retroreflector 120, it may be preferred to orient the corner cube reflectors 162 into an overlapping, generally triangular pattern as shown in FIG. 7.

It is noted that the tracking retroreflector 120 as shown in FIGS. 7-10 could potentially be used to replace not only the retroreflectors 26 but also the height detectors 24 as previously described. For such height detection the photodetectors 150-154 would have to be segmented such that the impingement of the laser beam along the extended lengths of the photodetectors 150-154 could be used in accordance with known techniques to perform the height detection function.

Having thus described the three dimensional measurement system of the present invention in detail and by reference to a preferred embodiment thereof, it will be apparent that modifications and variations are possible without departing from the scope of the invention defined in the appended claims. For example, although a pair of height detectors 24 and a pair of retroreflectors 26 are shown in FIG. 2, it will be appreciated that a receiver including only one retroreflector and one height detector may prove adequate in some applications, while in other applications, the disclosed tracking retroreflector may be preferred. A number of different elements may be used to provide for retroreflection to the transmitter in place of the retroreflective tape or cylinders, for example three mirrored surfaces arranged at right angles in a corner cube configuration could be used as shown in the tracking retroreflector. Additionally, in some situations it may not be desired to terminate transmission of tee laser beam completely. In lieu of terminating the transmission of the beam entirely, the amplitude of the beam may be altered in another fashion and the period of time required to detect this modulation measured.

What is claimed is:

1. A laser beam measurement system, comprising:
    a transmitter at one position which produces a laser reference plane by sweeping a laser beam about the transmitter;
    a receiver located at a position remote from said transmitter which receiver intercepts the laser reference plane;
    reflector means at said receiver for reflecting said laser beam back to said transmitter when the laser beam sweeps past said receiver;
    first means at said transmitter for sensing said laser beam reflected back to said transmitter from said receiver;
    azimuth means at said transmitter, responsive to said first means, for providing electrical angle signals indicative of the angle at which said receiver is positioned with respect to a reference axis that extends from said transmitter;
    second means at said transmitter, responsive to said first means, for causing said transmitter to modulate said beam in response to sensing of said laser beam reflected back to said transmitter by said reflector means; and
    third means at said transmitter, responsive to said first means and said second means, for producing an electrical signal indicative of the period of time between said modulation and the sensing by said first means of such modulation of said laser beam reflected back to said transmitter, said time period being indicative of the range of said receiver from said transmitter.

2. The system of claim 1 in which said modulation of said beam comprises momentarily terminating transmission of said beam by said transmitter.

3. The system of claim 2 in which said electrical signal produced by said third means is represented as a count.

4. The system of claim 1 in which said reflector means is a passive reflector device.

5. The system of claim 4 in which said passive reflector device is at least one retroreflective cylinder.

6. The system of claim 4 in which said passive reflector device comprises at least one corner cube and tracking means for directing said at least one corner cube toward said transmitter.

7. The system of claim 6 in which said tracking means comprises:
    a first photodetector having second and third photodetectors positioned on opposite sides thereof, said photodetectors generating electrical signals when said laser beam impinges thereon;
    lens means for directing said laser beam onto a field including said first, second and third photodetectors;
    motive means for rotating said reflector device; and
    circuit means responsive to the electrical signals generated by said photodetectors for controlling said motive means to maintain said reflector device positioned such that said laser beam impinges upon said first photodetector.

8. The system of claim 7 wherein said lens means comprises a cylindrical lens.

9. The system of claim 1 further comprising:
    signal transmitting means at said transmitter for sending to said receiver the range information indicated by said electrical signal produced by said third means.

10. The system of claim 9 further comprising:
signal receiving means at said receiver for receiving the range information sent to said receiver by said signal transmitting means.

11. In a laser beam position measurement system having a transmitter at one position which produces a laser reference plane by sweeping a laser beam about the transmitter, a receiver located at a position remote from said transmitter which receiver intercepts the laser reference plane and azimuth means at said transmitter for providing electrical angle signals indicative of the angle at which said receiver is positioned with respect to a reference axis that extends from said transmitter, the improvement therein comprising:
reflector means at said receiver for reflecting laser energy in the laser beam back to said transmitter when the laser beam sweeps past said receiver;
first means at said transmitter for sensing laser energy reflected back to said transmitter from said receiver;
second means at said transmitter being responsive to said first means for momentarily shutting off said laser beam in response to sensing of laser energy reflected back to said transmitter by said reflector means;
third means at said transmitter, responsive to said first means and said second means, for generating range signals by measuring the period of time between the shutting off of said laser beam and the termination of sensing by said first means of laser energy reflected back to said transmitter after the shutting off of said laser beam, said time period measured being indicative of the range of said receiver from said transmitter; and
fourth means at said transmitter for transmitting said angle signals and said range signals to said receiver.

12. The system of claim 11 further comprising:
fifth means at said receiver for receiving said angle and range signals transmitted to said receiver by said fourth means at said transmitter.

13. The system of claim 11 in which said range signals produced by said third means is represented as a count.

14. The system of claim 11 in which said reflector means is a passive reflector device.

15. The system of claim 14 in which said passive reflector is at least one retroreflective cylinder.

16. The system of claim 14 in which said passive reflector device comprises at least one corner cube and tracking means for directing said at least one corner cube toward said transmitter.

17. The system of claim 16 in which said tracking means comprises:
a first photodetector having second and third photodetectors positioned on opposite sides thereof, said photodetectors generating electrical signals when said laser beam impinges thereon;
lens means for directing said laser beam onto a field including said first, second and third photodetectors;
motive means for rotating said reflector device; and
circuit means responsive to the electrical signals generated by said photodetectors for controlling said motive means to maintain said reflector device positioned such that said laser beam impinges upon said first photodetector.

18. The system of claim 17 wherein said lens means comprises a cylindrical lens.

19. In a laser beam measurement system having at one position a transmitter which produces a laser reference plane by sweeping a laser beam about the transmitter and at another position remote from said transmitter a receiver which intercepts the laser reference plane, the improvement therein comprising:
at least one passive retroreflective cylinder at said receiver for reflecting laser energy in the laser beam back to said transmitter when the laser beam sweeps past said receiver:
a detector at said transmitter for sensing laser energy reflected back to said transmitter from said retroreflective cylinder;
a timer at said transmitter being coupled to said detector and being operable to modulate the laser beam of said transmitter in response to receipt of reflected laser energy by said detector;
a clock at said transmitter being operable to produce electrical pulses at a predetermined rate; and
a counter at said transmitter being connected to said clock, said detector and said timer, said counter being enabled by said timer to start counting said electrical pulses received from said clock when said timer begins to modulate said transmitter, said counter being disabled by said detector to stop counting said electrical pulses in response to detection of modulation of said reflected laser energy by said detector, said number of pulses counted by said counter being directly proportional to the range of said receiver from said transmitter.

* * * * *